US012155644B2

(12) United States Patent
Goerbing et al.

(10) Patent No.: US 12,155,644 B2
(45) Date of Patent: Nov. 26, 2024

(54) AUTHENTICATING A DEVICE IN A COMMUNICATION NETWORK OF AN AUTOMATION INSTALLATION

(71) Applicant: Siemens Aktiengesellschaft, Munich (DE)

(72) Inventors: Andrej Goerbing, Berlin (DE); Jonas Hurrelmann, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 213 days.

(21) Appl. No.: 17/696,009

(22) Filed: Mar. 16, 2022

(65) Prior Publication Data
US 2022/0303262 A1 Sep. 22, 2022

(30) Foreign Application Priority Data
Mar. 16, 2021 (EP) .................................. 21162795

(51) Int. Cl.
*H04L 9/40* (2022.01)
(52) U.S. Cl.
CPC ................................ *H04L 63/0823* (2013.01)
(58) Field of Classification Search
CPC . H04L 63/0823; H04L 12/42; H04L 63/0884; H04L 63/0892; H04L 63/08;
(Continued)

(56) References Cited

U.S. PATENT DOCUMENTS

| 8,014,406 B2 * | 9/2011 | Denecheau | ............. | H04L 63/08 370/352 |
| 10,182,015 B2 | 1/2019 | Heine | | |

(Continued)

FOREIGN PATENT DOCUMENTS

| CA | 3201909 A1 | 9/2014 |
| CN | 102461230 A | 5/2012 |

(Continued)

OTHER PUBLICATIONS

Kyland Technology: "A leading local provider of industrial communication solutions", IEC1158, IEC62439-3 IEE Std C37.238, 2015-11-25, www.kyland.com.cn.
(Continued)

*Primary Examiner* — Michael R Vaughan
(74) *Attorney, Agent, or Firm* — Laurence A. Greenberg; Werner H. Stemer; Ralph E. Locher

(57) ABSTRACT

A method authenticates a device in a communication network of an automation installation, in which authentication information indicating the device is transmitted to an authentication server that admits or rejects the device in the communication network as a subscriber. To perform an authentication of the device in a communication network configured with redundancy, the communication network has a communication ring that, besides the device, has first and second neighbor devices. At the start of the authentication the device sends authentication requests containing the authentication information to the neighbor devices. The neighbor devices duplicate the authentication information and send it via the communication ring in both transmission directions to an authentication server which uses the authentication information to perform a respective check on the authenticity of the device and admits or rejects the device in the communication network as a subscriber as the result of the check.

13 Claims, 7 Drawing Sheets

(58) Field of Classification Search
CPC .. H04L 12/437; H04L 63/083; H04L 63/0869
See application file for complete search history.

(56) References Cited

U.S. PATENT DOCUMENTS

| | | |
|---|---|---|
| 2005/0152305 A1 | 7/2005 | Ji et al. |
| 2010/0228980 A1 | 9/2010 | Falk et al. |
| 2011/0154454 A1 | 6/2011 | Frelechoux |
| 2015/0049639 A1 | 2/2015 | Angst et al. |
| 2016/0219051 A1 | 7/2016 | Morita et al. |
| 2016/0314057 A1 | 10/2016 | De Oliveira et al. |
| 2017/0134342 A1 | 5/2017 | Beyer et al. |
| 2020/0233402 A1 | 7/2020 | Sakic et al. |
| 2021/0309167 A1* | 10/2021 | Gourari ............... G06V 20/56 |
| 2022/0312202 A1* | 9/2022 | Goerbing ............. H04W 12/06 |
| 2023/0081174 A1 | 3/2023 | Campos et al. |

FOREIGN PATENT DOCUMENTS

| | | |
|---|---|---|
| CN | 103024745 A | 4/2013 |
| CN | 104378291 A | 2/2015 |
| CN | 107659578 A | 2/2018 |
| CN | 110998461 A | 4/2020 |
| CN | 111406259 A | 7/2020 |
| DE | 102006038592 A1 | 2/2008 |
| DE | 102014212484 A1 | 12/2015 |
| EP | 1909436 A1 | 4/2008 |
| EP | 2148473 A1 | 1/2010 |
| EP | 2784988 A1 | 10/2014 |
| JP | 2004310581 A | 11/2004 |
| WO | WO 2016015753 A1 | 2/2016 |

OTHER PUBLICATIONS

Chen Ke et al.: "Design of concentrator based on electric line broadband carrier and relay routing algorithm", (School of Automation Science and Electrical Engineering, Beihang University of, Beijing, 100191, China), Electric Power Automation vol. 31, No. 9, Sep. 2011—English abstract on p. 31.

* cited by examiner

AUTHENTICATING A DEVICE IN A COMMUNICATION NETWORK OF AN AUTOMATION INSTALLATION

CROSS-REFERENCE TO RELATED APPLICATION

This application claims the priority, under 35 U.S.C. § 119, of German Patent Application EP 21162795.5, filed Mar. 16, 2021; the prior application is herewith incorporated by reference in its entirety.

FIELD AND BACKGROUND OF THE INVENTION

The invention relates to a method for authenticating a device in a communication network of an automation installation, in which authentication information indicating the device is transmitted to an authentication server and the authentication server takes the authentication information as a basis for admitting or rejecting the device in the communication network as a subscriber.

The invention also relates first to a communication-enabled device for connection to a communication network of an automation installation and second to a communication network having such a device and to an authentication server.

Communication-enabled devices, that is to say devices that can be connected to a communication network and use the latter to interchange data with other devices by transmitting applicable data telegrams, or messages, are used in many fields of technology today, e.g. in the automation of installations. One example of the use of such devices in a communication network is an automation installation, in which network-enabled automation devices (also referred to simply as "devices" hereinafter) are connected to one another via the communication network for the purpose of interchanging data telegrams. Automation installations are used for automating systems, e.g. electrical energy supply networks or electrical switchgear installations, and usually contain automation devices (e.g. so-called field devices) arranged in the vicinity of primary components of the applicable installation, that is to say e.g. of the electrical energy supply network. In the case of an electrical energy supply network, such primary components may be for example electrical cables and lines, transformers, generators, motors or converters. The devices can be for example so-called electrical protection devices or field control devices installed in substations of electrical energy supply networks. In the jargon, such devices are often also referred to as so-called "IEDs" ("Intelligent Electronic Devices"). In this case, the devices are connected to the communication network and use the latter to interchange data telegrams containing for example control commands, reports about events (e.g. threshold value contraventions), measured values or status reports as payload data.

Automation installations often constitute security-critical systems that need to be protected against unauthorized interventions and manipulations. Therefore, in the communication networks of such automation installations, usually only such devices as have previously undergone a registration are permitted to interchange data with one another, in the course of which registration first their identity is ascertained and second their authorization to interchange data in the communication network is ascertained by a superordinate authority. This process is also referred to as "authentication".

There are various known methods regarding how a device can be authenticated in a communication network. As such, the standard IEEE 802.1X defines an authentication protocol that makes it possible to ensure that only authorized devices can access a communication network (e.g. a LAN) via enabled communication ports ("access ports") of access points, such as e.g. Ethernet bridges. This port-based authentication according to IEEE 802.1X is often used in communication networks appertaining to information technology (IT). Use also occurs in the context of operation technology (OT), but here the method encounters its limits now and then owing to specific distinctive characteristics, as will be explained in detail later.

FIG. 1 shows an illustration based on IEEE 802.1X-2020, section 7.1, for explaining the authentication of a device 10 for data interchange in a communication network 11. In this case, the device 10 ("host") is connected to an access point 13 of the communication network 11 via a point-to-point connection 12. The device 10 can be for example a personal computer, a communication-enabled terminal or an automation device of an automation installation. The access point 13 can be formed by an Ethernet bridge, for example. After the device 10 has been connected to the access point 13 and switched on, the device in the role of the "supplicant" sends a message 15 containing its authentication information to the access point 13. This can be done by means of the so-called "Extensible Authentication Protocol over LAN" (EAPOL). In this case, the access point 13 assumes the role of the "authenticator" and forwards the authentication information with a further message 16 to an authentication server 14, which can be e.g. a "Remote Authentication Dial-In User Service" (RADIUS) server. The forwarding of the authentication information can be affected for example with a so-called "Extensible Authentication Protocol" (EAP) message embedded in messages of an AAA protocol (authentication, authorization and accounting), for example of the RADIUS protocol.

The authentication server 14 checks the validity of the received authentication information. This can be done for example by checking whether the received authentication information matches reference authentication information, which can be contained for example in a database associated with the authentication server. An alternative consists in checking whether a certificate linked with the authentication information is trusted. Depending on the result of the check, the authentication server responds with an appropriate message 17 to the access point 13, which message causes the access point either to admit the device to the communication network (successful authentication) or to reject the device (failed authentication). After successful authentication, the access point opens its access port and the now authenticated device begins data interchange with other devices in the communication network.

In this way, it can be ensured that only authorized devices may connect to the communication network and the communication network is thus protected against manipulation by third parties and other security attacks, e.g. "eavesdropping", "spoofing" or "denial-of-service".

In addition to safeguarding against attacks, many installations operated in an automated manner also require a high level of failsafety. This requirement has major repercussions on the communication network by which the devices of such an installation are connected to one another. Such communication networks are therefore usually configured with redundancy, that is to say that the reliable transmission of data telegrams between the individual devices is ensured even in the event of the failure of a communication connection within the communication network. The term "communication connection" is intended hereinafter to encompass the complete transmission link between the respective devices, that is to say to encompass both an available (wired or wireless) transmission medium and the physical, communication-technological and logical linking thereof to the respective device (e.g. interfaces, communication apparatuses, protocol stacks).

One possibility for configuring a communication network with failsafety and, in so doing, ensuring largely seamless continuing operation of the automation installation even in the case of a disturbance of a communication connection is described as the so-called "High-availability Seamless Redundancy" protocol (HSR) in the standard IEC 62439-3. One example of a communication network 20 set up in accordance with HSR is shown in FIG. 2.

The HSR communication network 20 of FIG. 2 is set up in a ring topology, and therefore contains at least one communication ring 21, each device 22 usually being incorporated in the communication ring 21 as a so-called "Double Attached Node HSR" (DANH). The devices 22 are each connected directly to their respective neighbor devices. Devices having only one communication port ("Single Attached Node"—SAN) 23 can be coupled to the communication ring 21 via a redundancy unit ("RedBox") 24 (and possibly a bridge 25). A transmission device 22a sends two data telegrams (or two duplicates of a message) 26a, 26b in both directions of the communication ring 21. In order to be able to be identified as a redundant HSR message, special headers in the form of a so-called "HSR tag" are placed at the front of the two messages 26a, 26b. The neighboring devices 22 receive the messages 26a, 26b with one communication port and forward them using their other communication port, if necessary. Unicast messages that are addressed to the respective device 22 are dealt with and not forwarded, whereas unicast messages that are not addressed to the respective device are forwarded. In addition, broadcast messages and multicast messages are dealt with and additionally forwarded. Messages that arrive at the transmitter again after a complete lap of the communication ring 21 are discarded.

In the case of correct operation, the duplicated messages 26a, 26b are received in a receiver device 22b via a respective communication port. The receiver device 22b forwards the data telegram 26a that arrives first to an application layer for processing. The data telegram 26b that arrives later is discarded as a duplicate. Duplicates can be identified by a unique sequence number in the HSR tag.

HSR communication networks are in widespread use in the field of industrial communication and in substations of energy supply networks. Seamless redundancy is achieved in this case by virtue of the communication network 20 being set up as a closed ring structure, with the result that two mutually independent communication paths always exist between all connected devices 22 and, even in the event of a disturbance of one of the two communication paths, transmission of the data telegram is guaranteed via the respective other transmission path. If a connection is faulty or a device is faulty, then although the communication ring 21 is interrupted, all other devices can continue to communicate with one another via the chain structure that has remained.

The use of a communication network set up in accordance with the HSR standard is known for example from European patent application EP 2148473 A1.

However, the above-described procedure for authenticating a device is not designed for redundant communication networks.

The person skilled in the art therefore addresses the problem of also being able to perform an authentication of a device in a communication network designed with redundancy, in particular a communication network designed according to IEC 62439-3 HSR.

SUMMARY OF THE INVENTION

In order to solve this problem, a method of the type described at the outset is developed according to the invention to the effect that the communication network has a communication ring that, besides the device, has at least one first neighbor device and a second neighbor device, the device being connected to the first neighbor device via a first communication port and to the second neighbor device via a second communication port for the purpose of redundant data transmission. At the start of the authentication the device uses the first communication port to send a first authentication request containing the authentication information to the first neighbor device and uses the second communication port to send a second authentication request containing the authentication information to the second neighbor device.

The authentication request can consist of one or more messages. Accordingly, authentication responses sent by the authentication server as a reaction to the authentication request can consist of one or more messages. It is therefore possible for multiple messages to be interchanged between the device acting as authenticator and the authentication server.

By way of example, a combination of username and password, an identification of the device, e.g. a Secure Device Identifier (DevID), and/or a device certificate can be used as authentication information. The first neighbor device and the second neighbor device duplicate the respective received authentication information and send it via the communication ring in both transmission directions to an authentication server connected to the communication ring. The authentication server uses the respective received authentication information to perform a respective check on the authenticity of the device and admits or rejects the device in the communication network as a subscriber as the result of the check.

According to the invention, an authentication of the communication ports of the device to the respective neighbor device therefore takes place. Within the meaning of the standard IEEE 802.1X, the devices can take on either the role of the "supplicant" or the role of the "authenticator", depending on whether they are the device to be authenticated or one of the neighbor devices. The method according to the invention therefore has the advantage that, apart from at the device itself, no changes at all need be made to the HSR communication network in order to be able to perform an authentication. In particular, there is also no need to introduce proprietary changes regarding the HSR standard, which would make interoperability with other devices more difficult.

Specifically, there may be provision for the communication network to be configured for redundant data transmission in accordance with the standard IEC 62439-3 HSR. Thus, in particular, full compatibility with the standards IEEE 802.1X and IEC 62439-3 HSR is afforded in the case of the method according to the invention.

A further advantageous embodiment of the method according to the invention provides for the device and the two neighbor devices to perform a reciprocal authentication. This reciprocal authentication can preferably be carried out simultaneously or substantially simultaneously.

In the case of this embodiment, the starting device and each of its two neighbor devices reciprocally authenticate one another. Within the meaning of the standard IEEE 802.1X, each of the devices thus assumes the roles of "supplicant" and "authenticator" simultaneously. The authentication server therefore receives a total of four authentication requests in this embodiment:

The device, in the role of the supplicant, sends an EAPOL message to the first neighbor device, which takes on the role of the authenticator in this regard. The first neighbor device then sends an EAP/AAA message in each of the two directions of the communication ring to the authentication server, which processes the first of the two messages. The device, in the role of the supplicant, also sends an EAPOL message to the second neighbor device, which likewise takes on the role of the authenticator in this regard. The second neighbor device then sends an EAP/AAA message in each of the two directions of the communication ring to the authentication server, which processes the first of the two messages.

Additionally, the first neighbor device, in the role of the supplicant, sends an EAPOL message to the device, which takes on the role of the authenticator in this regard and sends an EAP/AAA message in each of the two directions of the communication ring. The authentication server also receives these messages and processes the first of the two messages to arrive.

Finally, the second neighbor device, in the role of the supplicant, also sends an EAPOL message to the device, which also takes on the role of the authenticator in this regard and sends an EAP/AAA message in each of the two directions of the communication ring. The authentication server also receives these messages and processes the first of the two messages to arrive.

Each of the EAP/AAA messages is therefore sent in duplicate via the HSR ring. The authentication communication described takes place with parallel timing, more or less simultaneously and independently of one another.

According to a further advantageous embodiment of the method according to the invention, there may be provision for the authenticity of the device to be checked by comparing the received authentication information with reference authentication information and/or checking a certificate contained in the authentication information for whether it is trusted, and for the device to be admitted in the communication network in the event of a match.

In this case, the reference authentication information may have been stored in a database of the authentication server during a system configuration, for example. In regard to the certificate, it is possible to check for example whether the authentication server regards that authority that issued the certificate as trusted.

A further advantageous embodiment of the method according to the invention provides for a respective authentication response to be sent to the first neighbor device and the second neighbor device as a reaction to the check, which response indicates whether or not the respective neighbor device may admit the device in the communication network for the purpose of communication. As mentioned above, the authentication response can consist of one or more messages.

According to a further advantageous embodiment of the method according to the invention, there may be provision for the authentication server to be connected to the communication ring via a redundancy ballast, the redundancy ballast being connected to the communication ring via two communication ports and to the authentication server via a further communication port.

The redundancy ballast is therefore a so-called RedBox within the meaning of the standard IEC 62439-3 HSR.

In this case, the authentication server may be connected to the redundancy ballast directly or via an Ethernet bridge or a local area communication network (such as e.g. a substation LAN) or else via a combination of multiple LANs and wide area networks (WANs).

Alternatively, there may be provision for the authentication server to be connected to the communication ring via two communication ports. In this case, the authentication server is incorporated in the communication ring as a DANH within the meaning of the standard IEC 62439-3 HSR.

After appropriate checking, the authentication server in both embodiments returns an applicable message to the respective neighbor device in each transmission direction of the communication ring.

Specifically, the authentication server, in the DANH role, uses its communication ports incorporated in the communication ring to send the authentication response directly in each transmission direction. In the case of a coupling via the redundancy ballast, the authentication server initially sends only one authentication response and the redundancy ballast undertakes the duplication and the sending in each transmission direction.

According to a further advantageous embodiment of the method according to the invention, there may be provision such that if the communication ring is interrupted then the two devices adjoining the location of the interruption each perform a fresh authentication after the connection is restored.

In this way, it is possible to ensure that even after the communication ring has been interrupted only trusted devices may communicate with one another in the communication network. If the communication connection between two devices has been interrupted, the fresh authentication is limited to those communication ports between which the interruption has occurred. In this case, the two devices connected to one another by the interrupted and now restored link reciprocally authenticate one another. In the event of an interruption on account of a device that has failed, the authentication for the device (or a substitute device) takes place for both communication ports of the device that has failed. The device that has previously failed and is now starting again (or a substitute device) specifically reciprocally authenticates itself with each of its two neighbor devices.

A further advantageous embodiment of the method according to the invention provides for the device to have a first authentication apparatus, which is connected to the first communication port via a first port access control unit, and a second authentication apparatus, which is connected to the second communication port via a second port access control unit, the respective authentication apparatus generating the respective authentication request and sending it via the respective communication port.

In this way, simple means can be used to initiate a separate authentication for each of the two transmission directions.

In this context, there may also be provision for the first port access control unit and the second port access control unit to be connected to a redundancy unit of the device and to be configured so as, during the authentication of the device, to forward exclusively messages that are used for authenticating the device between the redundancy unit and the communication ports and to block the forwarding of other messages, and to forward the other messages between the redundancy unit and the communication ports only after successful authentication of the device.

The respective port access control unit therefore ensures that no data communication by the device with other devices in the communication network can take place until authentication of the device has been successfully completed. Only forwarding of messages for the purpose of authentication is permitted. After successful authentication, on the other hand, the relevant redundant data telegrams are interchanged with the communication network.

In regard to the redundancy unit, there may also be provision such that after successful authentication of the device the redundancy unit duplicates telegrams to be sent by the device and sends them via both communication ports and inspects telegrams received from the device for whether an identical telegram has already been received, and forwards the received telegram to an application layer of the device or discards said telegram on the basis of the check.

After successful authentication of the device, the redundancy unit thus performs the functionality for redundant data interchange.

The design described also holds for a redundancy ballast if the device is connected to the communication ring via a redundancy ballast.

According to a further advantageous embodiment of the method according to the invention, there may be provision such that when a device is connected to a redundancy ballast via a single communication port, the device generates the authentication request and sends it via the single communication port, and the redundancy ballast sends the authentication information of the device to the first neighbor device via a first communication port and sends it to the second neighbor device via a second communication port.

In the case of this embodiment, the device itself is not redundantly connected to the communication network, since it has only one communication port (within the meaning of the standard IEC 62439-3 HSR a so-called "Single Attached Node"—SAN). In this case, the device is connected to a redundancy ballast, e.g. a so-called "RedBox", which is connected to the two neighbor devices in the communication ring via two communication ports. The authentication in this case takes place e.g. between the redundancy ballast and the device to be authenticated. To connect further devices to the redundancy ballast, the latter may be connected to the device via an Ethernet bridge.

The aforementioned problem is also solved by a communication-enabled device for connection to a communication network of an automation installation, the communication network having a communication ring, wherein the device has a first communication port for connecting to a first neighbor device and a second communication port for connecting to a second neighbor device for the purpose of redundant data transmission.

According to the invention, there is provision for the device to be designed to perform a method according to the method claims.

All explanations given above and below concerning the method according to the invention are applicable with regard to the device according to the invention, and vice versa, mutatis mutandis; in particular, the device according to the invention is configured to perform the method according to the invention in any arbitrary embodiment or a combination of arbitrary embodiments. With regard to the advantages of the device according to the invention too, reference is made to the advantages described with respect to the method according to the invention.

One advantageous embodiment of the device according to the invention provides for the device to have a first authentication apparatus, connected to the first communication port via a first port access control unit, that is configured to generate a first authentication request containing authentication information at the start of an authentication of the device. The device has a second authentication apparatus, connected to the second communication port via a second port access control unit, that is configured to generate a second authentication request containing the authentication information at the start of an authentication of the device. The device is configured to use the first communication port to send the first authentication request and to use the second communication port to send the second authentication request Additionally, there may be provision in this context for the first port access control unit and the second port access control unit to be connected to a redundancy unit of the device and to be configured so as, during the authentication of the device, to forward exclusively messages that are used for authenticating the device between the redundancy unit and the communication ports and to block the forwarding of other messages, and to forward the other messages between the redundancy unit and the communication ports only after successful authentication of the device.

Additionally, there may be provision for the redundancy unit to be configured so as, after successful authentication of the device, to duplicate telegrams to be sent by the device and to send them via both communication ports and to inspect telegrams received from the device for whether an identical telegram has already been received, and to forward the received telegram to an application layer of the device or to discard the telegram on the basis of the check.

The aforementioned problem is also solved by an authentication server that is indirectly or directly connected to a communication ring of a communication network and is configured to use a device as the device claims to perform a method as claimed in one of the method claims.

Finally, the aforementioned problem is also solved by a communication network of an automation installation having a communication ring, an authentication server and a device to be authenticated. According to the invention, there is provision for the communication network to be designed to authenticate the device by performing a method as claimed in one of the method claims. To this end, the components of the communication network interact as appropriate.

In this context, there may also be provision for the device to be designed in accordance with one of device claims and to be connected via its first communication port to a first neighbor device of the communication ring and by its second communication port to a second neighbor device of the communication ring.

The invention is explained more thoroughly below on the basis of an exemplary embodiment. The specific configuration of the exemplary embodiment should in no way be understood as restrictive for the general configuration of the method according to the invention and of the apparatus according to the invention; rather, individual configuration features of the exemplary embodiment can be combined arbitrarily freely among one another and with the features described above.

Other features which are considered as characteristic for the invention are set forth in the appended claims.

Although the invention is illustrated and described herein as embodied in an authenticating device in a communication network of an automation installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
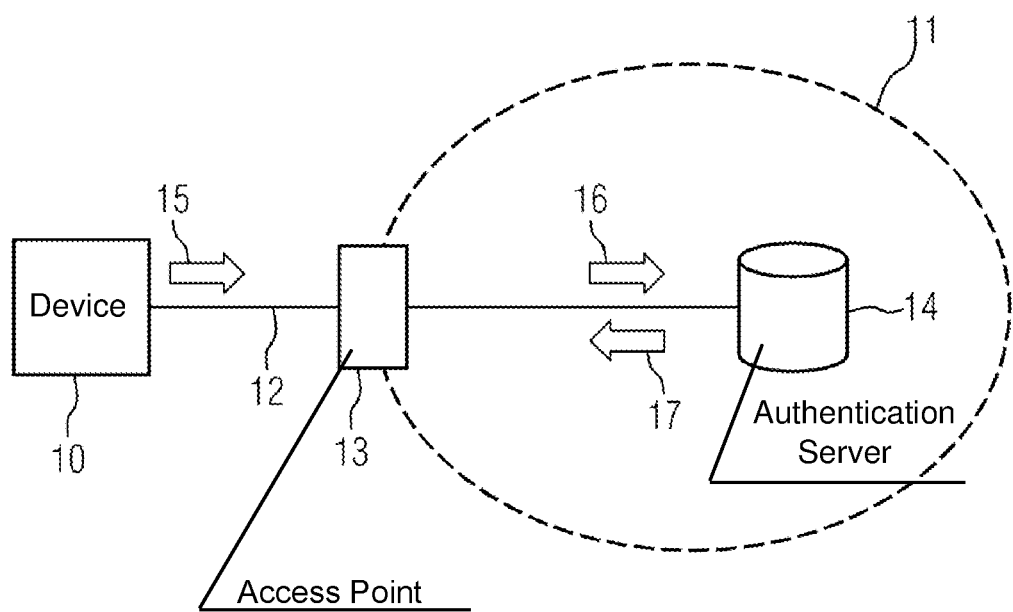
FIG. 1 is an illustration of a device to be authenticated in a communication network based on the prior art.
Figure 2:
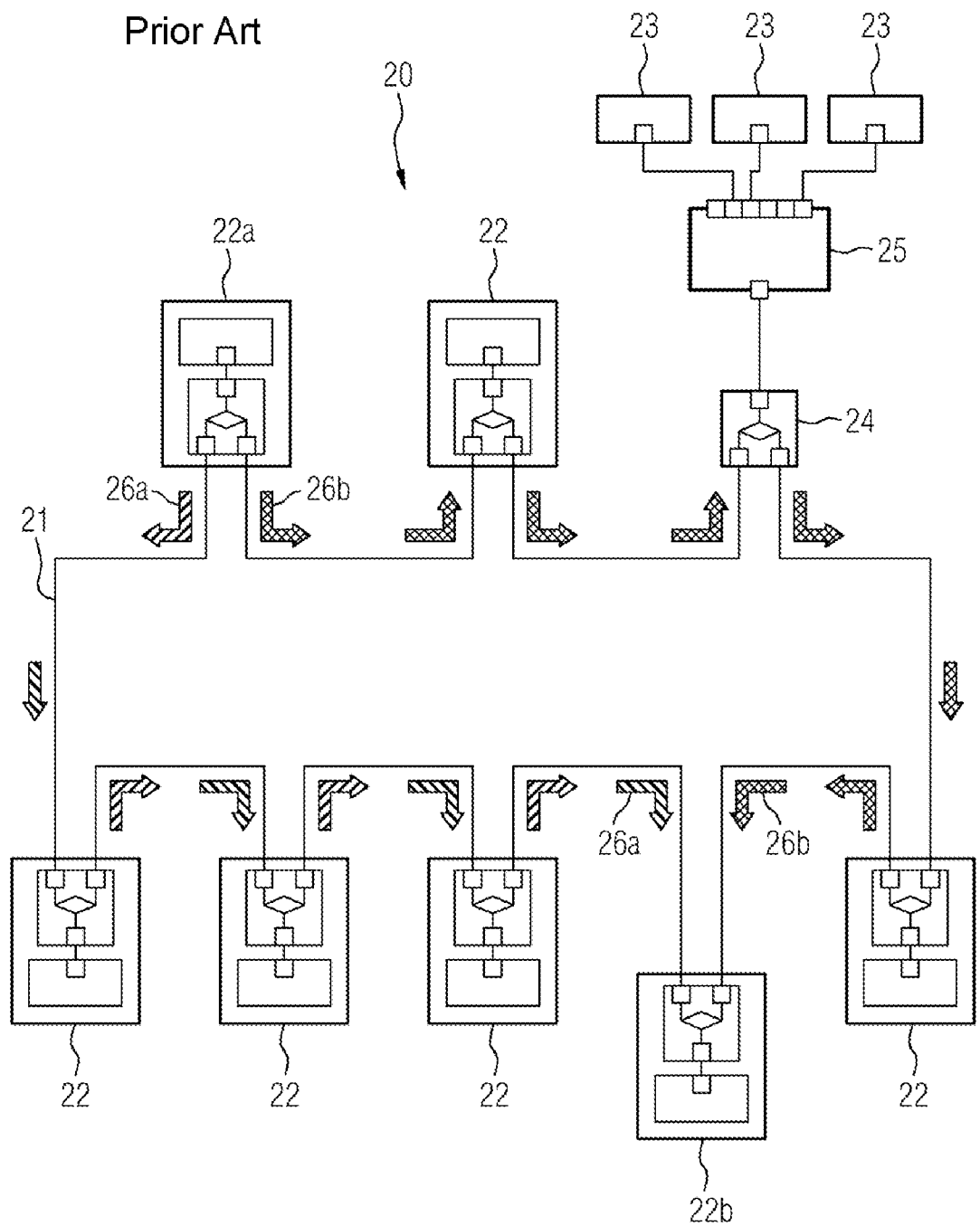
FIG. 2 is a block diagram showing an example of a communication network designed with redundancy in accordance with IEC 62439-3 HSR based on the prior art.
Figure 3:
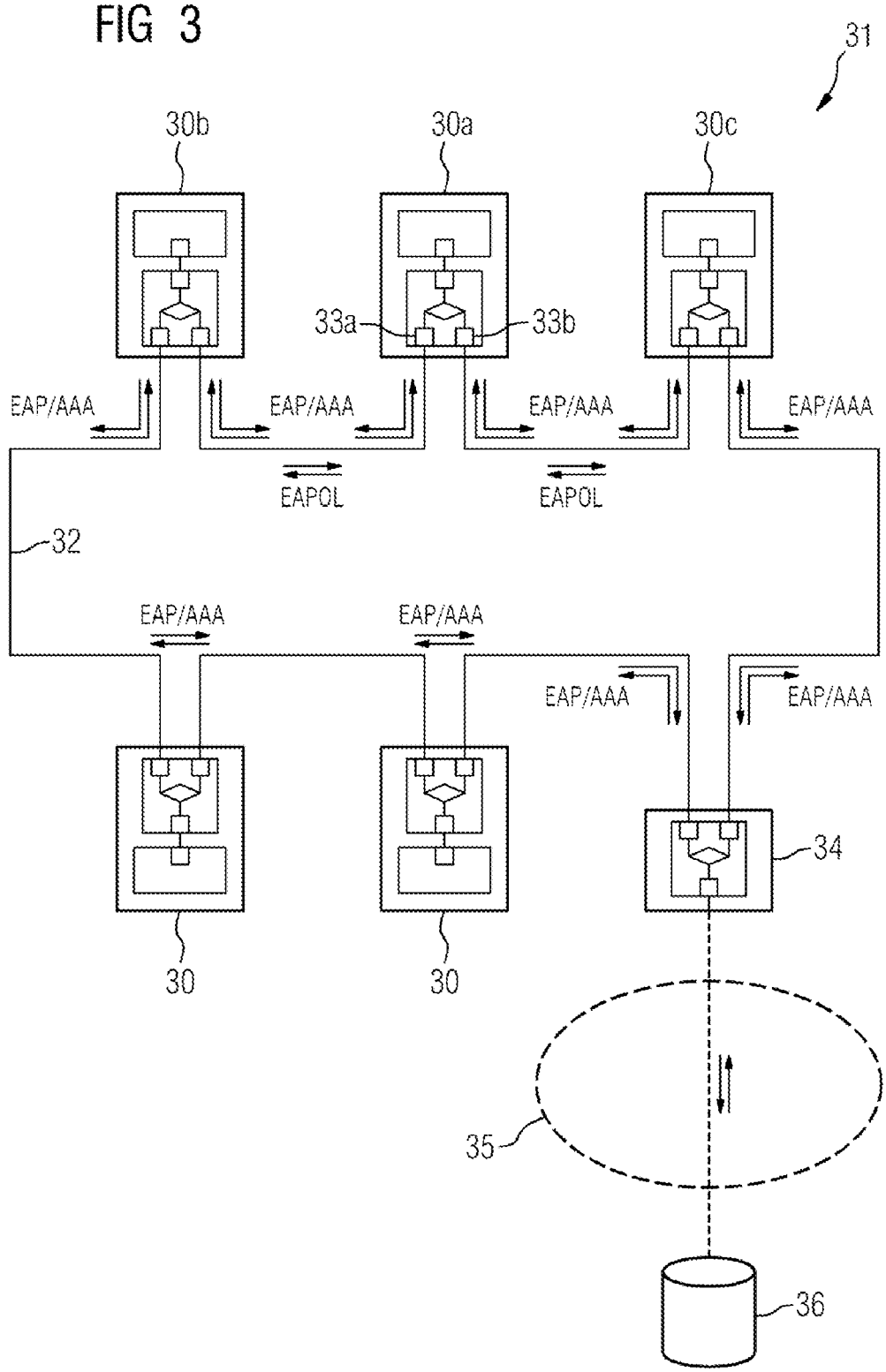
FIG. 3 is a block diagram showing an illustrative representation of a device to be authenticated that is redundantly connected to a communication network.

Referring now to the figures of the drawings in detail and first, particularly to FIG. 3 thereof, there is shown a communication-enabled device 30a that is intended to be admitted in a communication network 31 as a subscriber and performs an authentication procedure for this purpose. The communication network 31 is designed for redundant data transmission, e.g. in accordance with the standard IEC 62439-3 HSR, and for this purpose contains a communication ring 32 in which not only the device 30a but also further devices 30, in particular neighbor devices 30b and 30c, which are situated directly adjacent to the device 30a in the communication ring 32, and a redundancy ballast 34 ("HSR RedBox") are arranged. The redundancy ballast 34 has an authentication server 36 connected to it—possibly via a separate LAN or possibly also WAN 35.

For the purpose of data transmission, the device 30a is connected to a first neighbor device 30b via a first communication port 33a and to a second neighbor device 30c via a second port 33b in the communication ring 32. There are point-to-point connections between the device 30a and the respective neighbor device 30b, 30c. The devices 30, 30a, 30b, 30c constitute a Double Attached Node (DANH) within the meaning of the standard IEC 62439-3 HSR.

The devices 30, 30a, the neighbor devices 30b, 30c and the communication network 31 with the communication ring 32 can belong for example to an automation installation of a technical system (e.g. of an energy supply network, of a manufacturing installation or of a process installation). In this case, the device can be for example an automation device for regulating, controlling, monitoring and/or protecting the technical system.

In principle, multiple or even all devices 30, 30a-c of the communication network 31 can perform an authentication. This can happen successively or simultaneously. The messages to be interchanged for this purpose, e.g. EAP/AAA messages, need to be able to pass through other devices, irrespective of whether or not the devices have already been successfully authenticated. For the sake of simplicity, it will be assumed below that only the device 30a is intended to be authenticated. Any data communication with this device 30a that is not used for authentication is initially not permitted.

For authentication purposes, the device 30a performs the authentication process separately for each of its communication ports 33a, 33b and both directions of the communication ring 32. Within the meaning of the standard IEEE 802.1X, for this purpose the device 30a takes on the role of the "supplicant", while the respective neighbor device 30b, 30c takes on the role of the "authenticator". In general, all of the devices 30, 30a-c—depending on whether they themselves are authenticated or take part in the authentication of a neighboring device—are capable of taking on the role of both the supplicant and the authenticator. Specifically, this may be configured such that the device 30a and its first neighbor device 30b, on the one hand, and the device 30a and its second neighbor device 30c, on the other hand, each reciprocally authenticate one another. This takes place in parallel and largely simultaneously. All three devices are then both supplicant and authenticator via their communication ports, depending on which EAPOL messages or EAP/AAA messages they are sending or receiving.

Labels in this regard ("EAPOL", "EAP/AAA") in the figures should be understood to be merely explanatory and nonlimiting as examples.

The authentication is illustrated below from the point of view of the device 30a. The explanations can be applied to the other devices 30 and 30b, 30c in a corresponding manner. At the start of the authentication, the device 30a uses each of its communication ports 33a, 33b to send a respective authentication request to the respective neighbor device 30b, 30c. The authentication requests include authentication information of the device 30a and can be designed in accordance with the EAPOL protocol, for example. Such authentication requests are not duplicated, but rather are sent or received independently via each of the communication ports 33a, 33b. They are merely interchanged locally between the two neighboring devices (e.g. 30a, 30b) and not forwarded along the communication ring 32 to other devices by the neighbor device 30b, 30c via the respective other communication port. Accordingly, the authentication requests also have no redundancy header ("HSR tag").

The neighbor devices 30b, 30c, in the role of the authenticator, (and also the device 30a itself) forward the authentication information to the authentication server 36 connected to the communication ring 32. EAP/AAA messages can be used for this. These messages are duplicated before they are sent, and are each sent in both directions of the communication ring 32 via both communication ports of the devices 30a, 30b, 30c. They therefore also again pass through the device 30a to be authenticated, which forwards them in the relevant direction. Accordingly, these messages have the redundancy header ("HSR tag").

In respect of the messages interchanged for authentication, it should be noted that EAPOL messages are interchanged only on the connection between the immediate neighbors; they are not duplicated and not sent on in this case. EAP/AAA messages, on the other hand, are duplicated and are sent and received via the HSR ring (and beyond).

These messages can also reach devices within the communication ring 32 that are not yet authenticated and that therefore may not interchange data telegrams with other devices—apart from messages relating to an authentication. In order that such unauthenticated devices can forward messages relating to the authentication, there may be provision for a special filter function or for a VLAN reserved for such messages, permitting sending and receiving for specific messages via inherently unauthenticated communication ports.

On the way to the authentication server 36, the messages containing the authentication information reach the redundancy ballast 34. This performs duplicate detection and sends on only the particular data telegram that arrives first in the direction of the authentication server 36.

In the embodiment of FIG. 3, the authentication server 36 is connected to the communication ring 32 via the redundancy ballast 34. This has the advantage that the authentication server 36 can also provide its service for other communication networks. Alternatively, the authentication server could also be incorporated in the communication ring 32 like the devices 30, 30a-c having two communication ports (in accordance with a DANH).

The authentication server 36 receives the authentication information and uses it to check whether the device 30a may be admitted to the communication network 31 as a subscriber. For this purpose, the authentication server 36 has access to respective reference authentication information specific to the device 30a, with which it compares the received authentication information. Alternatively or additionally, it is also possible to check whether a certificate contained in the authentication information is trusted.

Since, as illustrated above, a reciprocal authentication process can take place between the device 30a and the two neighbor devices 30b, 30c, the authentication server 36 can, in an applicable embodiment, receive authentication requests concerning these three devices 30a-c and deal with them in an appropriate manner.

The (EAP-based) authentication is thus performed first from the first communication port 33a to the authentication server 36 via the first neighbor device 30b and second from the second communication port 33b to the authentication server 36 via the second neighbor device 30c. All in all, the authentication server 36 receives the authentication information concerning the device 30a twice, namely once for each communication port 33a, 33b of the device 30a, or for each transmission direction in the communication ring 32. In the case of a reciprocal authentication, it additionally receives authentication information for those communication ports of the neighbor devices 30b, 30c that are facing the device 30a. In this case, the identical authentication information is sent to the authentication server 36 using both transmission directions of the communication ring 32, the authentication server then making identical decisions for each communication port of the device 30a regarding whether the device 30a may be admitted to the communication network 31 as a subscriber.

In accordance with the decision, the authentication server 36 sends authentication responses to the neighbor devices 30b, 30c, which, if authentication is successful, open their ports connected to the communication ports 33a, 33b for unrestricted data interchange. In the case of a reciprocal authentication, authentication responses relating to the neighbor devices are also sent to the device 30a itself; the device then also opens its communication ports for unrestricted data interchange with the neighbor devices 30b, 30c.

In this way, the device 30a and its direct neighbor devices 30b, 30c perform the authentication with one another. After successful authentication, the respective devices 30a-c can use their interconnected communication ports to interchange data telegrams with one another. In this way, the communication ring 32 in this section is closed. Simultaneous or successive authentication of all devices 30, 30a-c in the communication ring 32 allows the latter to be closed completely for regular data communication.

Figure 4:
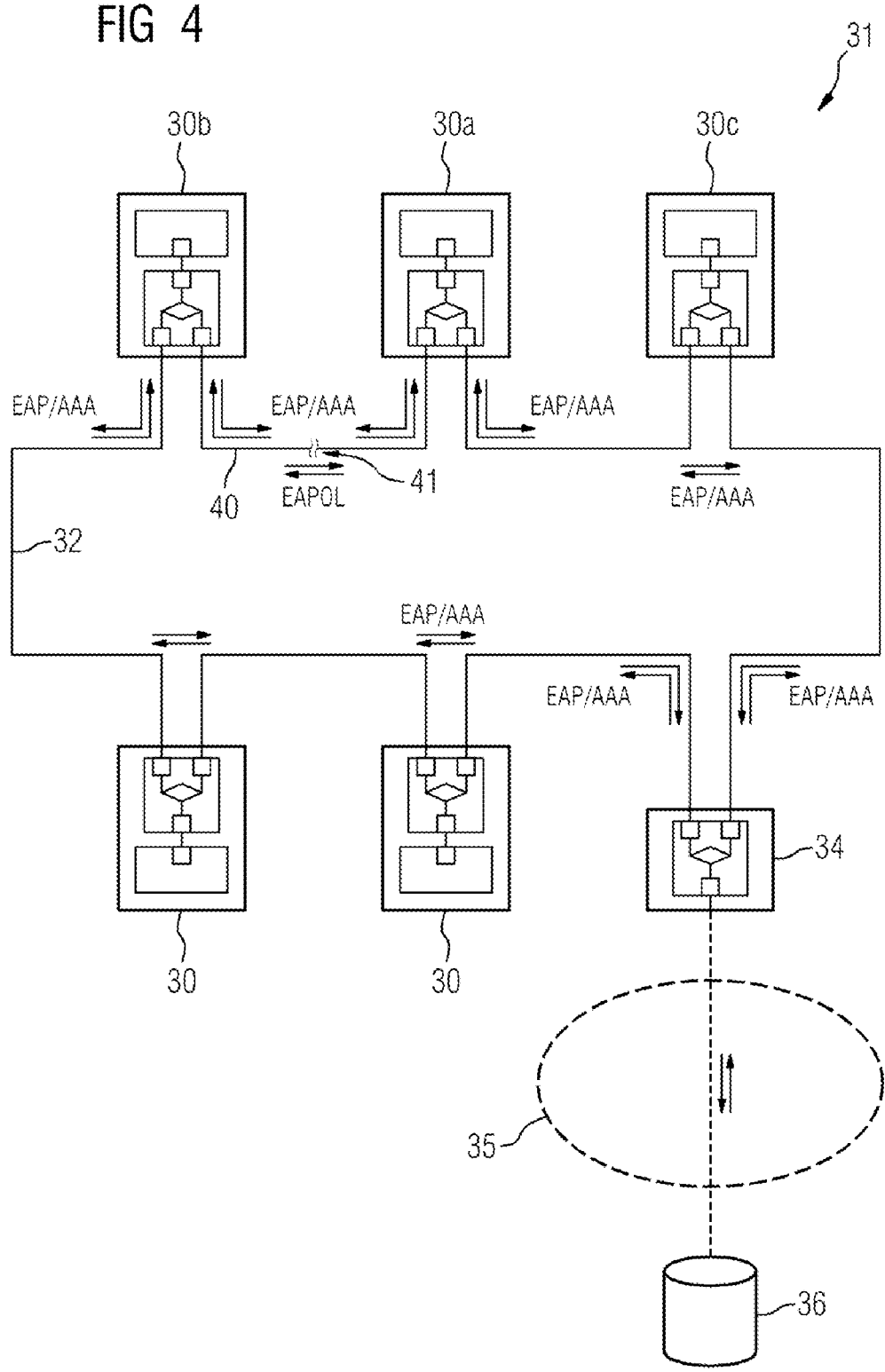
FIG. 4 is a block diagram showing an illustrative representation of the communication network of FIG. 3 after an interruption.

FIG. 4 shows the situation after the communication connection is restored following an interruption to a line. In this regard, it is assumed that the communication line 40 was interrupted at the interruption location 41. The ring structure means that data communication with all devices is guaranteed even during the interruption. After the connection is restored, the two devices 30a, 30b that are directly adjacent to the interruption location 41 need to re-authenticate their communication ports with one another.

Such reciprocal authentication takes place according to the same scheme, in principle, as has already been explained for FIG. 3. Authentication requests (EAPOL messages) are interchanged between the devices locally. Each of the devices then sends on the authentication information of the respective other device in duplicated messages (EAP/AAA) to the authentication server 36 in both transmission directions, the authentication server admitting the respective devices to the communication network again if an inspection is positive. After successful authentication, the data traffic can be resumed at the interrupted location, which means that the redundancy is restored.

Figure 5:
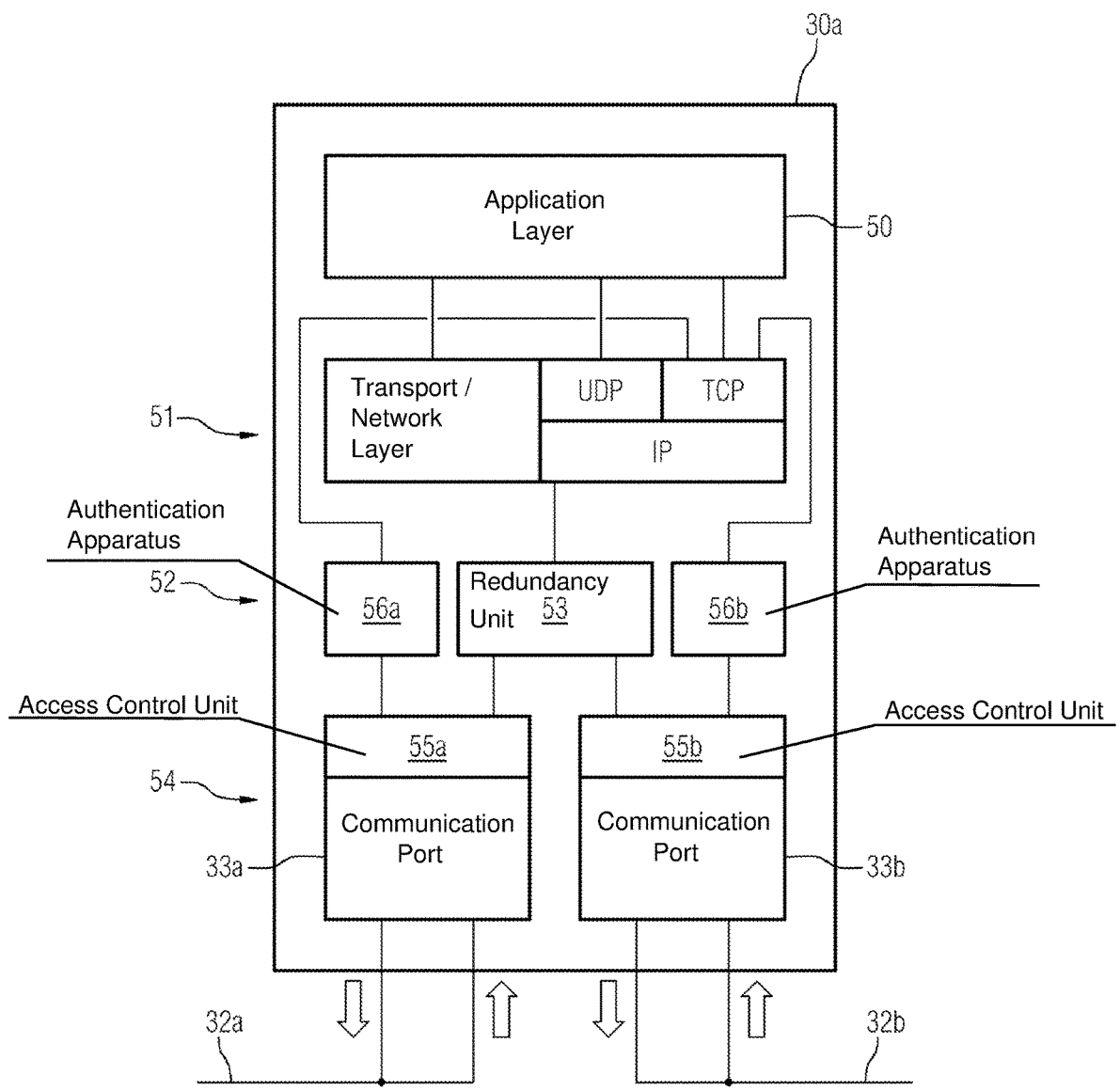
FIG. 5 is a block diagram showing a schematic representation of the design of a device to be authenticated.

FIG. 5, finally, shows the schematic design of the communication structure of the device 30a (the devices 30, 30a-c are designed in a manner corresponding to one another in this regard). The device 30a has an application layer 50 on which the actual device functions are carried out by means of device software, for example running on a processor, or an integrated logic chip with hardware encoding (ASIC, FPGA). For the purpose of external communication, the application layer 50 accesses a transport/network layer 51, which has protocol stacks for realtime communication ("hard real-time stack") and the protocols UDP, TCP and IP.

This transport/network layer 51 is connected to a redundancy unit 53 of a link layer 52, which is in turn connected to the first communication port 33a and to the second communication port 33b of the device 30a on a physical layer 54. The communication ports 33a and 33b are connected to the communication ring 32, which is only indicated in FIG. 5, for the purpose of data interchange.

A first and a second port access control unit 55a and 55b are arranged between the communication ports 33a and 33b and the redundancy unit 53 in terms of function. The respective port access control unit 55a or 55b is additionally connected to a respective authentication apparatus 56a or 56b. The authentication apparatuses 56a, 56b are furthermore connected to the TCP protocol unit of the transport/network layer 51.

The device-side authentication is performed as described below. The two instances of the port access control unit 55a and 55b serve as a protocol-less shim and can be implemented e.g. either as a "port access controller" PAC within the meaning of IEEE 802.1X-2020 or as an "MAC security entity" (SecY) within the meaning of IEEE 802.1AE MAC Security (MACsec) with additional data encryption.

Each port access control unit 55a, 55b is connected to a communication port 33a, 33b of the redundancy unit "Link Redundancy Entity" (LRE) and to a respective instance of the authentication apparatuses 56a, 56b. The authentication apparatuses 56a, 56b are for example authentication protocol machines according to IEEE 802.1X-2020.

The authentication apparatuses 56a, 56b initiate the authentication of the device 30a by generating the authentication requests and transmitting them to the respective communication port 33a, 33b via the respective port access controller 55a, 55b for the purpose of transmission to the communication ring 32. Messages (e.g. EAPOL messages) relating to the authentication are thus always interchanged between the respective authentication apparatus 56a, 56b and the respective communication port 33a, 33b. No redundancy header is appended to the authentication requests in this case.

The authentication apparatuses present in the neighbor devices 30b, 30c send and receive their messages used for authentication (e.g. EAP/AAA messages) according to the authenticator role of the standard IEEE 802.1X. These messages are duplicated for their respective transmission direction. The respective authentication apparatus 56a, 56b is internally connected to the TCI/IP protocol stack, with the result that such messages can be sent via the redundancy unit 53. The reasons for connecting the authentication apparatuses 56a, 56b to the TCP/IP protocol stack are firstly that EAP/AAA messages (produced or consumed by the respective authentication apparatus 56a, 56b) are based on the protocols TLS/TCP/IP and secondly that these messages need to be sent/received via the redundancy unit 53 in order to produce or eliminate duplicates.

These messages (e.g. the EAP/AAA messages) are thus sent and received via the redundancy unit 53 and the two communication ports 33a, 33b. The redundancy unit 53 performs the duplication (sending) or duplicate elimination (receiving) for the messages and inserts the redundancy header ("HSR tag") for sending or removes the redundancy header for receiving, as it would do for any "normal" data communication. The port access controllers 55a, 55b implement the filter function permitting such messages to be transmitted between the communication port 33a, 33b and the redundancy unit 53 during the authentication process.

After the successful authentication of the device 30a, the port access control units 55a, 55b ensure that the data interchange takes place between the redundancy unit 53 and the communication port 33a, 33b in regular fashion. The port access control units 55a, 55b thus serve as status-dependent changeover switches for the communication between the respective communication port, on the one hand, and the authentication apparatus 56a, 56b, or the redundancy unit 53, on the other hand.

Ultimately, the authentication is performed independently first by the first authentication apparatus 56a for one transmission direction in the communication ring 32 and second by the second authentication apparatus 56b for the second transmission direction of the communication ring 32.

Besides the functional design described for the device 30a in FIG. 5, which design can be applied to the other devices 30, 30b, 30c in a corresponding manner, no changes or extensions are needed in respect of the individual components of the communication network, and so the solution described is fully compatible with the standards IEEE 802.1X and IEC 62439-3 HSR.

Figure 6:
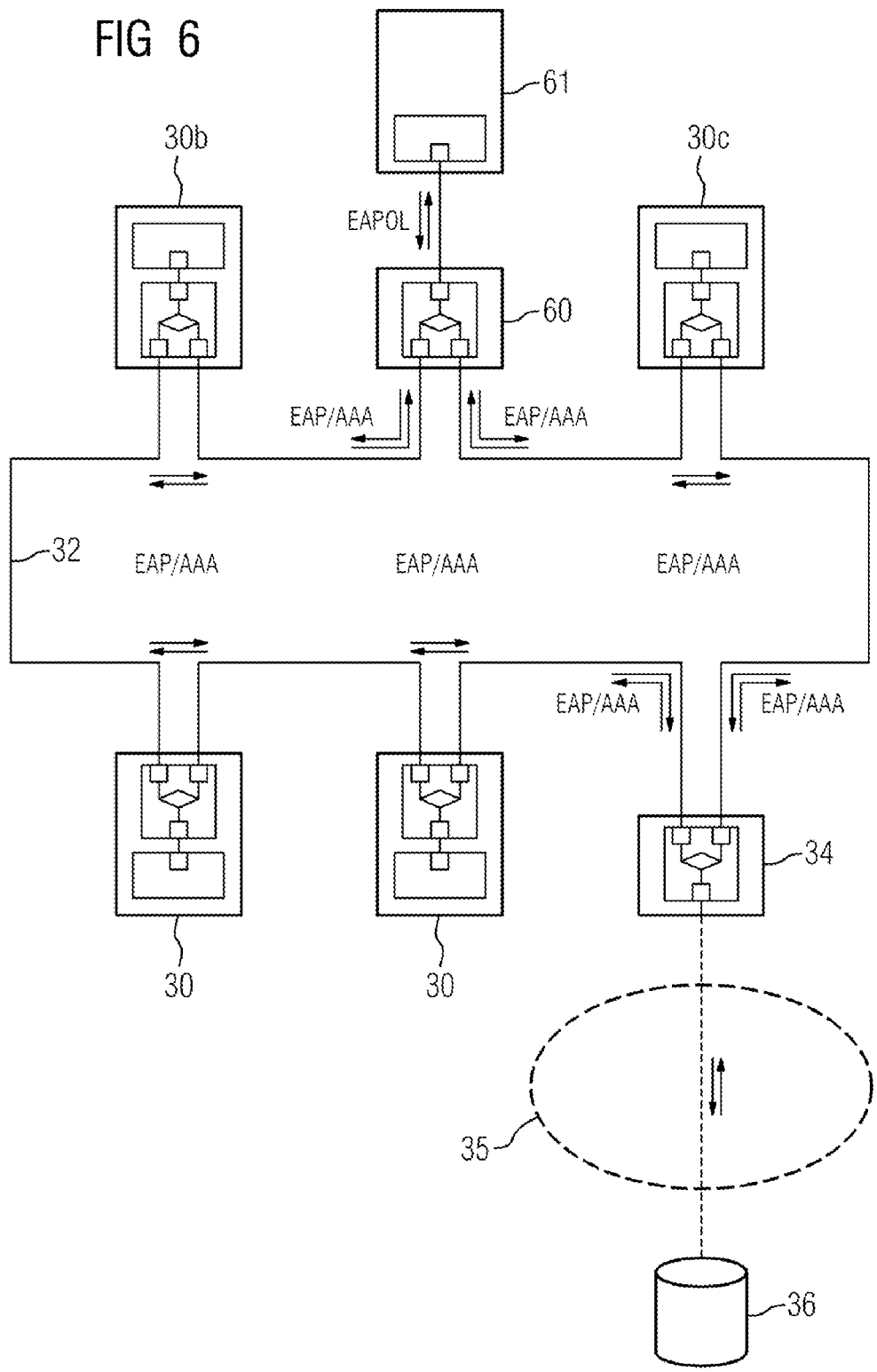
FIG. 6 is a block diagram showing an illustrative representation of a communication network with a device to be authenticated that is connected by means of a redundancy ballast.

FIG. 6 shows the situation in which a device that has only one communication port (within the meaning of the standard IEC 62439-3 a "Single Attached Node"—SAN) is connected to the communication network via a redundancy ballast, e.g. a so-called RedBox. A redundancy ballast in this case comprises at least three communication ports, two communication ports being used to redundantly connect it to the two subnetworks neighbor devices of the communication ring and the third communication port being used to connect it to the device.

According to FIG. 6, a device 61 is connected directly to the redundancy ballast 60. In this case, the device 61 authenticates itself by sending an authentication request (e.g. an EAPOL message) to the redundancy ballast 60. Within the meaning of the standard IEEE 802.1X, the device 61 in this case assumes the role of the "supplicant" and the redundancy ballast 60 assumes the role of the "authenticator". The redundancy ballast 60 duplicates the authentication information contained in the authentication request and then sends it via the two redundant communication ports to the neighbor devices 30b, 30c of the communication ring 32 (e.g. in the form of EAP/AAA messages). The authentication server uses the authentication information, as already explained for FIG. 3, to perform a check on whether the device 61 may be admitted to the communication network. The response is sent to the redundancy ballast 60, which, if the authentication is successful, opens its communication port connected to the device 61 for regular data communication.

The device 61 could also be connected to the redundancy ballast 60 via an Ethernet bridge (not shown). This variant has the advantage that the redundancy ballast 60 can be connected not only to the device 61 but also to further devices. In this case, the switch assumes the role of the "authenticator" and receives the authentication request from the device 61. The authentication information contained therein is then forwarded to the redundancy ballast 60 in a message (e.g. EAP/AAA). There, the duplication of the message takes place and the authentication information is forwarded in both transmission directions of the communication ring 32. The check in the authentication server is carried out as described for FIG. 3. If the result of the check is positive, the authentication server prompts the port of the switch for the device 61 to open.

An authentication of the redundancy ballast 60 itself takes place as described for the device 30a (cf. e.g. FIG. 3). The redundancy ballast 60 and the neighbor devices 30b, 30c can reciprocally authenticate one another and virtually take on a combined "supplicant"/"authenticator" role. There is the possibility of messages used for authentication (e.g. EAP/AAA messages) being sent via as yet unauthenticated ports; this may be the case in particular with the reciprocal authentication described. The devices can have special filters or reserved VLANs for this that are disabled for regular data interchange.

The nonredundant communication port of the redundancy ballast could also have an access point of a subnetwork of a PRP communication network connected to it. In a communication network designed according to IEC 62439-3 PRP, a message is duplicated and is sent to the receiver via two redundant subnetworks, the receiver processing the message that arrives first and discarding the other as a duplicate. In the case cited above, complete connection of the HSR communication ring to a PRP communication network would require a further redundancy ballast to be connected to the access point of the other subnetwork. In this case, the redundancy ballast is an HSR-PRP RedBox. Similarly, four redundancy ballasts, two of which are coupled via their nonredundant communication ports in each case, can be used to connect two HSR communication rings to one another. These redundancy ballasts could then be regarded as HSR-HSR RedBoxes, or as a so-called "QuadBox" in an integrated device. In the case of the examples cited, a respective redundancy ballast in a combined "supplicant"/ "authenticator" role can be used to reciprocally authenticate the respective other connected redundancy ballasts, or switches, or access points.

Figure 7:
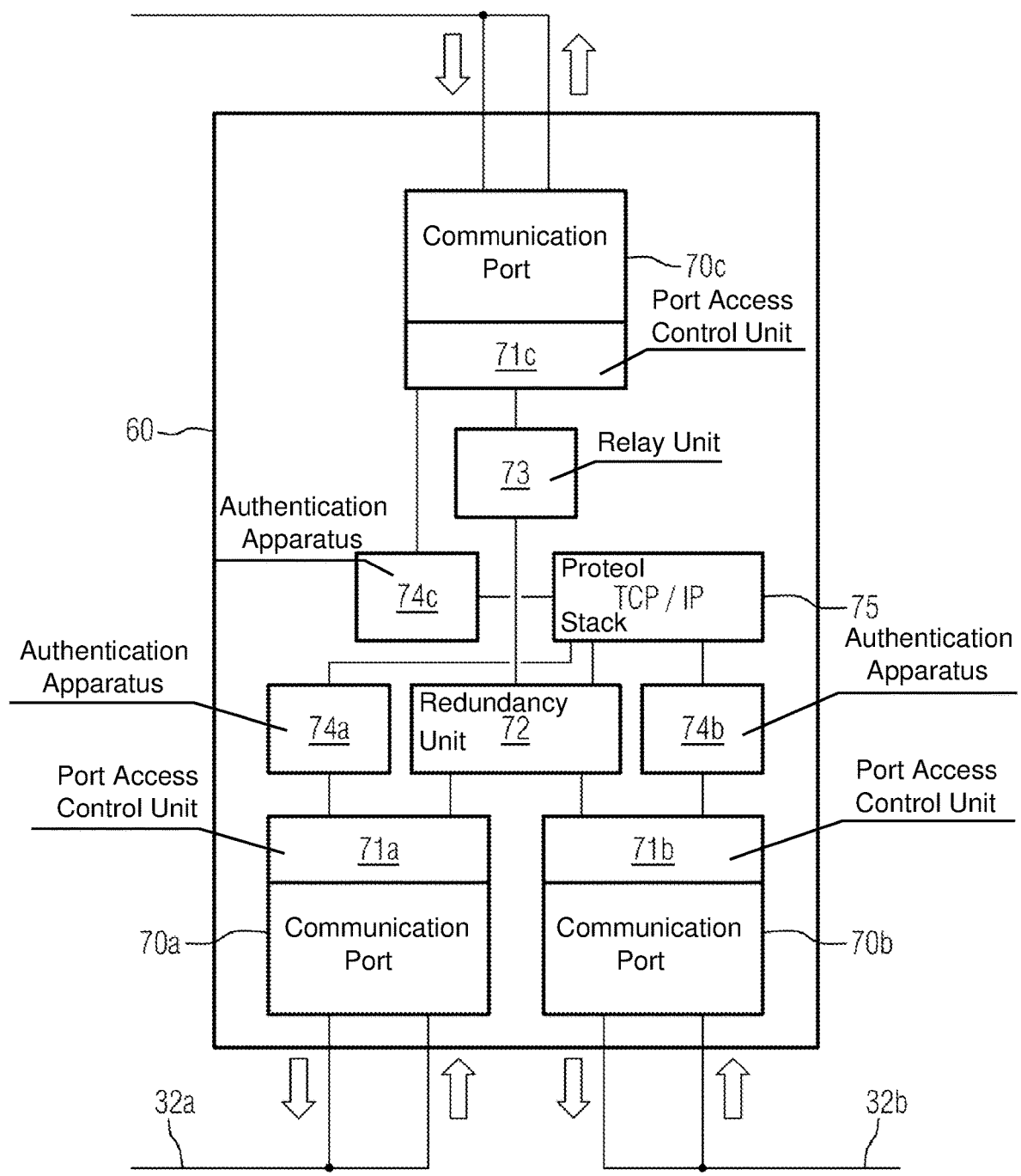
FIG. 7 is a block diagram showing a schematic representation of the design of a redundancy ballast.

FIG. 7, finally, shows the design of the communication structure of the redundancy ballast 60 with its three communication ports 70a, 70b, 70c, of which the two redundant communication ports 70a, 70b are connected to the two neighbor devices 30b and 30c (cf. FIG. 6) and the nonredundant communication port 70c ("Interlink Port") is connected either directly or indirectly to a device 61, which has only one communication port. In practice, there may also be multiple instances of the nonredundant communication port 70c. Each communication port 70a-c is connected to a port access control unit 71a-c, which may be designed in a manner corresponding to the port access control units 55a, 55b (cf. FIG. 5). Each of the port access control units 71a-c is connected to a redundancy unit 72, which may be designed like the redundancy unit 53 (cf. FIG. 5), for regular data communication. The nonredundant communication port 70c is connected to the redundancy unit 72 via an MAC relay unit ("Media Access Control Relay Entity") 73. The MAC relay unit 73 carries out a bridge functionality in regard to the one or more nonredundant communication ports 70c.

In addition, the port access control units 70a-c are connected to authentication apparatuses 74a-c, which may be designed in a manner corresponding to the authentication apparatuses 56a, 56b and carry out the "supplicant" and "authenticator" roles according to IEEE 802-1X. The port access control units 71a-c are designed to interchange authentication requests (EAPOL messages) and other messages (EAP/AAA messages) used for authentication between the communication ports 70a-c and the authentication apparatuses 74a-c during the authentication and, after successful authentication, to handle the regular data communication between the communication ports 70a-c and the redundancy unit 72.

Here too, the authentication is performed by the authentication apparatuses 74a-c independently for each communication port 70a-c. In this context, the authentication apparatuses 74a-c send and receive the messages that are used for authentication (e.g. EAPOL, EAP/AAA). For this purpose, the authentication apparatuses 74a-c are connected to a TCP/IP protocol stack 75 of the redundancy ballast 60. Messages (EAP/AAA) interchanged with the authentication server are duplicated for the purpose of the authentication, or duplicate elimination is performed, to which end said messages are sent via the redundancy unit 72, which also adds the redundancy headers (HSR tag). The special filter function of the port access control units 71a-c causes messages that are used for authentication to be able to be sent via the redundancy unit 72 even before successful authentication. The redundancy ballasts can therefore be used to perform an authentication of devices having only one communication port via their nonredundant communication port (in this case the redundancy ballast takes on the role of the authenticator according to IEEE 802.1X). In addition, neighboring switches in a combined supplicant/ authenticator role can be authenticated. The redundancy ballasts can use the aforementioned special filter function, or a reserved VLAN, to ensure that messages that are used for authentication (EAP/AAA messages) can be dealt with and sent even before successfully completed authentication.

There is the possibility of activating and deactivating the authentication function of redundancy ballasts, or of providing the latter with specific data (e.g. certificates), by way of a network manager by using a suitable protocol (e.g. SNMP) or other means (e.g. command line interface, web-based interface, etc.).

In summary, the invention provides a solution as to how an authentication of a device can be effected in a communication network designed with redundancy. In particular, the authentication is effected in a port-based manner according to the standard IEEE 802.1X in a communication network designed in accordance with the standard IEC 62439-3 HSR. Redundancy ballasts are also taken into consideration in this case. The solution described is particularly advantageously usable in industrial automation installations, for example in the context of the automation of energy supply networks. By this means, failsafety, on the one hand, and extremely stringent cyber-security requirements, on the other hand, can be effectively combined with one another.

Although the invention has been more thoroughly illustrated and described in detail above by way of preferred exemplary embodiments, the invention is not restricted by the examples disclosed, and other variations can be derived therefrom by the person skilled in the art, without departing from the scope of protection of the patent claims that follow.

The invention claimed is:

1. A method for authenticating a device in a communication network of an automation installation, which comprises the steps of:
   transmitting authentication information indicating the device to an authentication server and the authentication server taking the authentication information as a basis for admitting or rejecting the device in the communication network as a subscriber, the communication network having a communication ring that, besides the device, having at least one first neighbor device and a second neighbor device, the device being connected to the at least one first neighbor device via a first communication port and to the second neighbor device via a second communication port for redundant data transmission, the transmitting step includes the sub-steps of:
      using, at a start of authentication the device, the first communication port to send a first authentication request containing the authentication information to the at least one first neighbor device and using the second communication port to send a second authentication request containing the authentication information to the second neighbor device;
      duplicating the authentication information respectively received, via the at least one first neighbor device and the second neighbor device, and sending the authentication information via the communication ring in both transmission directions to the authentication server connected to the communication ring; and
      the authentication server using the authentication information respectively received to perform a respective check on an authenticity of the device and admitting or rejecting the device in the communication network as the subscriber as a result of the respective check.

2. The method according to claim 1, which further comprises configuring the communication network for the redundant data transmission in accordance with standard International Electrotechnical Commission 62439-3 high-availability seamless redundancy protocol.

3. The method according to claim 1, which further comprises performing a reciprocal authentication via the device and the first and second neighbor devices.

4. The method according to claim 1, which further comprises:
checking the authenticity of the device by comparing the authentication information received with reference authentication information and/or checking a certificate contained in the authentication information for whether it is trusted; and
admitting the device in the communication network in an event of a match.

5. The method according to claim 4, which further comprises sending a respective authentication response to the at least one first neighbor device and the second neighbor device as a reaction to a check, the respective authentication response indicates whether or not a respective neighbor device may admit the device in the communication network for a purpose of communication.

6. The method according to claim 1, which further comprises connecting the authentication server to the communication ring via a redundancy ballast, the redundancy ballast being connected to the communication ring via two communication ports and to the authentication server via a further communication port.

7. The method according to claim 6, which further comprises connecting the authentication server to the communication ring via two communication ports.

8. The method according to claim 1, wherein if the communication ring is interrupted then the two devices adjoining a location of an interruption each perform a fresh authentication after a connection is restored.

9. The method according to claim 1, wherein the device has a first authentication apparatus, which is connected to the first communication port via a first port access control unit, and a second authentication apparatus, which is connected to the second communication port via a second port access control unit, a respective one of the first and second authentication apparatuses generates a respective authentication request and sends the respective authentication request via the respective first or second communication port.

10. The method according to claim 9, wherein the first port access control unit and the second port access control unit are connected to a redundancy unit of the device and are configured so as, during the authentication of the device, to forward exclusively messages that are used for authenticating the device between the redundancy unit and the first and second communication ports and to block a forwarding of other messages, and to forward the other messages between the redundancy unit and the first and second communication ports only after successful authentication of the device.

11. The method according to claim 10, wherein after successful authentication of the device the redundancy unit duplicates telegrams to be sent by the device and sends them via both of the first and second communication ports and inspects telegrams received from the device for whether an identical telegram has already been received, and forwards the telegram received to an application layer of the device or discards the telegram on a basis of the respective check.

12. The method according to claim 1, which further comprises connecting the device to a redundancy ballast via a single communication port, the device generating an authentication request and sends the authentication request via the single communication port, and the redundancy ballast sends the authentication information of the device to the at least one first neighbor device via the first communication port and sends the authentication information to the second neighbor device via the second communication port.

13. A communication network of an automation installation, comprising:
an authentication server;
a device to be authenticated and having a first communication port and a second communication port;
a communication ring having, besides said device, at least one first neighbor device and a second neighbor device, said device being connected to said at least one first neighbor device via said first communication port and to said second neighbor device via said second communication port for redundant data transmission;
the communication network configured to authenticate said device by performing the steps of:
transmitting authentication information indicating said device to said authentication sever and said authentication server taking the authentication information as a basis for admitting or rejecting said device in the communication network as a subscriber, the transmitting step includes the substeps of:
using, at a start of authentication said device, said first communication port to send a first authentication request containing the authentication information to said at least one first neighbor device and using said second communication port to send a second authentication request containing the authentication information to said second neighbor device;
duplicating the authentication information respectively received, via said at least one first neighbor device and said second neighbor device, and sending the authentication information via said communication ring in both transmission directions to said authentication server connected to said communication ring; and
said authentication server using the authentication information respectively received to perform a respective check on an authenticity of said device and admitting or rejecting said device in the communication network as said subscriber as a result of the respective check.

* * * * *